United States Patent [19]

Muehlberger et al.

[11] Patent Number: 4,740,112

[45] Date of Patent: Apr. 26, 1988

[54] POWDER FEED CONTROL SYSTEM

[75] Inventors: Erich Muehlberger, San Clemente; Roland D. Kremith, Newport Beach; Gary A. Hislop, El Toro, all of Calif.

[73] Assignee: Electro-Plasma, Inc., Irvine, Calif.

[21] Appl. No.: 412,003

[22] Filed: Aug. 27, 1982

[51] Int. Cl.⁴ ............................................ B65G 53/66

[52] U.S. Cl. ............................................ 406/50; 406/93; 406/192

[58] Field of Search ............................................ 406/50, 93–95, 406/192

[56] References Cited

U.S. PATENT DOCUMENTS

| | | | |
|---|---|---|---|
| 1,223,586 | 4/1917 | Johnson | 406/192 X |
| 3,260,285 | 7/1966 | Vogt | 406/192 X |
| 3,291,536 | 12/1966 | Smoot | 406/50 X |
| 3,432,208 | 3/1969 | Hill et al. | 406/93 |
| 3,625,404 | 12/1971 | Probst | 406/93 X |

FOREIGN PATENT DOCUMENTS

| | | | |
|---|---|---|---|
| 2127767 | 4/1984 | United Kingdom | 406/93 |

*Primary Examiner*—Sherman D. Basinger
*Assistant Examiner*—James M. Kannofsky
*Attorney, Agent, or Firm*—Bogucki, Scherlacher, Mok & Roth

[57] ABSTRACT

A powder feed control system employs an arrangement of conduits and valves for selectively directing a gas flow either through a powder feeder or through a bypass so as to quickly and precisely control the introduction of powder into and the removal of powder from the gas flow in a plasma spraying system. The arrangement of conduits and valves includes a two-way solenoid operated valve for directing the gas flow either into a powder feeder through a main conduit or into a bypass conduit which rejoins the main conduit on the other side of the powder feeder at a powder shutoff valve and a bypass and check valve. The bypass and check valve insures that the gas flow in the bypass conduit flows to the output rather than upstream to the powder shutoff valve. The powder shutoff valve includes a resilient member mounted within the bore of a housing and collapsible upon itself to close off an internal bore therein in response to the introduction of pressurized gas into a space between the housing bore and the resilient member. Air introduced into a cannister in the powder feeder with the loading of powder into the cannister is removed by an arrangement which includes a valve for selectively coupling the inside of the cannister to a vacuum source.

9 Claims, 3 Drawing Sheets

POWDER FEED CONTROL SYSTEM

BACKGROUND OF THE INVENTION

1. Field of the Invention

The present invention relates to plasma spraying systems, and more particularly to arrangements for introducing powder in controlled fashion into a gas stream in a plasma spraying environment.

2. History of the Prior Art

Plasma spraying systems in which powder is selectively introduced into a flowing gas stream are well known. An example of such systems if provided by U.S. Pat. No. 4,328,257 of Muehlberger et al. which issued May 4, 1982 and which is commonly assigned with the present application. The Muehlberger et al. patent describes an arrangement in which a powder containing gas stream is introduced into a chamber at high temperatures and supersonic speeds to effect spraying of a work piece.

In plasma spraying systems of the type described in the Muehlberger et al. patent, the powder may be introduced into the flowing gas stream using various different designs of powder feeders. In a typical prior art powder feeder, the powder is loaded into a cylindrical cannister mounted at a 45° angle and having a slotted wheel at the lower end thereof. The wheel rotates so as to fill the slots with powder, following which the slots are moved into the path of a gas stream so that the powder within the slots is entrained into the stream. Powder feeders of this type have been found to have a number of shortcomings including principally nonuniformity in the supply of the powder.

This has led to the development of an improved powder feeder which is described in a co-pending application of Muehlberger et al., POWDER FEEDER, Ser. No. 387,356, filed June 11, 1982 and commonly assigned with the present application. The powder feeder described in the Muehlberger et al. application locates the powder cannister in an upright, generally vertical position and utilizes a stir spindle and a feed impeller mounted on a rotatable first drive shaft at the bottom of the cannister to agitate and mix the powder and then dispense the powder in controlled amounts from an aperture in the bottom of the cannister as the first drive shaft is driven by a motor. The controlled amounts of powder dispensed through the aperture in the bottom of the cannister are directed by a conduit through an aperture in the upper end of a housing and into a plurality of slots circumferentially formed about the outer periphery of a feed wheel mounted within the housing to be rotatably driven by a second drive shaft which is also coupled to be driven by the motor. The slots which are uniform in size have bottom surfaces and opposite side surfaces formed by opposite vanes extending upwardly from the upper surface of the feed wheel between a first hollow tube mounted in a fixed location relative to the feed wheel so as to direct a gas flow through the slots and an opposite second hollow tube disposed to receive the gas flow and the powder loaded into the slots. The constant action of the stir spindle, the feed impeller and the feed wheel provides a relatively constant, uniform supply of the powder to the gas stream, even in the face of varying operating conditions.

In the powder feeder described in the Muehlberger et al. application and in other types of powder feeders such as the one previously described, the gas flow is directed through a hose, tube or other conduit into the powder feeder and then through an area where controlled amounts of powder are disposed to another conduit which directs the resulting mixture of gas and powder into the plasma stream. When spraying is to begin, the source of pressurized gas is turned on to begin flow of the gas through the conduits and the powder feeder. A period of several seconds or longer is typically required in order to build up pressure within the powder feeder to a level at which spraying can commence and powder flow is constant. In the meantime, both time and powder are wasted. When spraying is terminated it is usually desirable or necessary to rid the system of excess powder in preparation for the next spraying operation. This operation which involves blowing residual powder out of the conduits and the powder feeding areas within the powder feeder can require as much as ten seconds or longer to perform and is also wasteful of both time and powder. Certain types of plasma spraying operations require that the powder be supplied during a succession of intervals of several seconds each. Present powder feed control systems typically require substantial delays between the short spraying intervals while the system is cleared of residual powder and then spraying pressure is again built back up after each signal to again commence spraying. The practical result is that such spraying operations require an inordinate amount of time as well as being wasteful of powder.

Accordingly, it would be desirable to be able to start and stop the feeding of powder with little or no time delays and at the same time in a manner which minimizes wastage of the powder. It would also be desirable to provide an arrangement for ridding the powder cannister of excess, entrapped air after it is loaded with powder so that a desired pressure within the powder feeder for optimum powder feeding can be quickly established and maintained. It would furthermore be desirable to provide an improved valve for use in powder feed control systems as well as in other applications where it is desired to quickly and effectively shut off a flowing powder-gas mixture.

BRIEF DESCRIPTION OF THE INVENTION

These and other objects are accomplished in accordance with the invention by a powder feed control system which maintains a continuous gas flow. An arrangement of valves and conduits is employed to direct the gas flow through the powder feeder during those times when powder is to be mixed into the gas flow for supply to a plasma spraying operation. When the supplying of powder is to be terminated, the gas flow is directed through a bypass which shunts the powder feeder. At the same time, the conduit and valve arrangement seals off the powder feeder so as to maintain optimum pressure therein in preparation for commencement of delivery of powder into the gas flow. When delivery of the powder is to again begin, the valve and conduit arrangement quickly switches the path of the gas flow frcm the bypass back into the powder feeder to commence delivery cf the powder at a desired volume and pressure with almost no delay. At the end of spraying, the gas flow is again quickly diverted from the powder feeder into the bypass.

The arrangement of valves and conduits includes a powder shutoff valve which is located immediately downstream of the powder feeder and which is operated by pressurized gas. At the same time as the incoming gas flow is diverted from the powder feeder into the bypass so as to stop delivery of the powder, the powder shutoff valve is closed to prevent any further powder from being delivered from the powder feeder into the spraying environment. The powder shutoff valve includes a generally cylindrical member of resilient material such as rubber mounted within a bore in a valve housing and having a central bore therethrough through which the powder passes. Application of pressurized air or other gas through an aperture in the side wall of the housing and into a small space between the walls of the bore within the hcusing and the resilient member compresses the resilient member onto itself to close off the central bore therethrough.

Air entrapped in the powder which is introduced into the cannister of the powder feeder during powder refilling operations is quickly purged by an arrangement including a two-way valve having an input coupled to a source of pressurized air, a first output coupled to atmosphere and a second output coupled to control a shutoff valve. The shutoff valve couples a vacuum source to the interior of the power feeder under the control of the second output of the two-way valve. The two-way valve is normally positioned to couple the source of pressurized air to the shutoff valve to hold the shutoff valve closed, thereby cutting off the vacuum source from the interior of the powder feeder. Upon replenishing the powder within the cannister, the two-way valve is operated to couple the source of pressurized air to atmosphere rather than to the shutoff valve. This opens the shutoff valve to couple the vacuum source to the inside cf the cannister, thereby evacuating any air trapped in the powder. After again closing the shutoff valve by action of the two-way valve, the gas pressure within the cannister can be quickly built up to the desired operating value by momentarily applying gas to the powder feeder.

In a preferred embodiment of a powder feed control system in accordance with the invention a two-way solenoid operated valve is arranged to direct the incoming gas flcw either through a check valve and into the powder feeder or into a feeder bypass line. The output of the powder feeder is coupled to the plasma spraying environment through the powder shutoff valve and an associated pneumatic bypass and check valve. The pneumatic bypass and check valve which has the downstream end of the feeder bypass line coupled thereto operates to allow the gas flow in the feeder bypass line to pass freely to the output while at the same time preventing such flow from backing upstream to the powder shutoff valve. The powder shutoff valve is operated by two different one-way solenoid operated valves, a first of which is normally positioned to apply pressurized air to the powder shutoff valve and the second of which is coupled to shunt the pressurized air away from the powder shutoff valve when the powder shutoff valve is to be opened. An alternative arrangement for controlling the powder shutoff valve includes a two-way solenoid operated valve arranged to alternatively pass pressurized air to the powder shutoff valve or shunt the pressurized air away from the powder shutoff valve depending upon whether the powder shutoff valve is to be closed or opened respectively.

BRIEF DESCRIPTION OF THE DRAWINGS

The foregoing and other objects, features and advantages of the invention will be apparent from the following more particular description of preferred embodiments of the invention, as illustrated in the accompanying drawings, in which.

DETAILED DESCRIPTION

Figure 1:
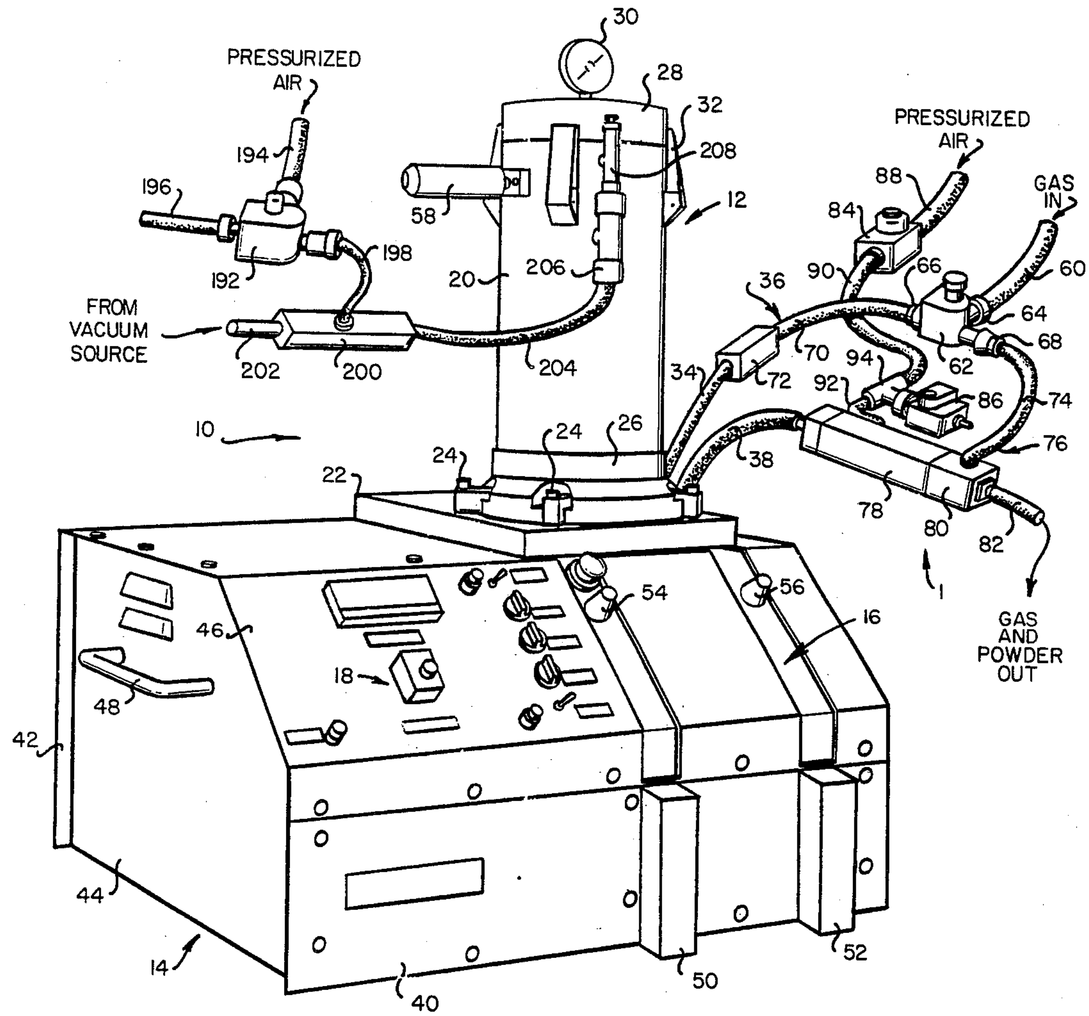
FIG. 1 is a perspective view of a powder feed control system in accordance with the invention.

FIG. 1 depicts a powder feed control system 1 in accordance with the invention. The control system 1 is depicted in conjunction with a powder feeder 10 which is of the type described in the previously referred to Muehlberger et al. application. The powder feeder 10 will be described only briefly hereafter, as it is described in substantial detail in the previously referred to Muehlberger et al. application which is incorporated hereir by reference. Also, it should be understood that other types of powder feeders can be used in conjunction with the powder feed control system 1 according to the invention.

The powder feeder 10 includes an upper hopper assembly 12 mounted on the top of a main chassis 14 for housing a lower hopper assembly 16 beneath the upper hopper assembly 12 and an electronic drive control assembly 18.

The upper hopper assembly 12 includes a hollow, generally cylindrical, vertically disposed powder cannister 20 for containing a quantity of powder to be fed into a gas stream. The cannister 20 is mounted on the upper surface of a main plate 22 by a plurality of cannister clamps 24 which secure a base 26 of the cannister 20 to the main plate 22. Access to the cannister 20 for purposes of loading powder therein is provided by a cannister window subassembly 28 mounting a pressure gauge 30 at the top thereof. The cannister window subassembly 28 which is normally mounted on the top of the cannister 20 may be removed by releasing a plurality of latches 32 so that the cannister 20 may be filled with powder. With the cannister window subassembly 28 held in place on top of the cannister 20 by the latches 32, the powder is sealed within the cannister 20 and pressure may be applied to and maintained within the interior of the cannister 20. The pressure gauge 30 provides an indication of the amount of pressure at the top of the cannister 20 and above the powder within the cannister 20.

As described in the previously referred to Muehlberger et al. application, the upper hopper assembly 12 includes a primary assembly located at the base of the cannister 20 just above the main plate 22 for mixing and agitating powder within the cannister 20 and dispensing controlled amounts of the powder to a secondary assembly mounted immediately below the main plate 22.

The secondary assembly includes a plurality of slots into which the powder from the primary assembly is loaded for feeding into a gas stream. The gas stream enters the powder feeder 10 via a hose section 34 comprising a part of a main conduit 36. The gas stream with powder fed therein exits the powder feeder 10 via a hose section 38 from which it is directed to a plasma spraying system or other utilizing device. The hose section 38 forms a part of the main conduit 36.

The main chassis 14 includes opposite front and back plates 40 and 42 respectively, opposite side plates 44 and a control panel 46. Each of the opposite side plates 44 has a handle 48 mounted thereon for ease in carrying the powder feeder 10.

The main chassis 14 encloses the lower hopper assembly 16 in the region of the upper hopper assembly 12. As described in the previously referred to application of Muehlberger et al., the lower hopper assembly 16 includes a motor coupled through various shafts and gears to drive both the primary and the secondary assemblies within the upper hopper assembly 12. The motor as well as the various other portions of the powder feeder 10 are controlled by the electronic drive control assembly 18, part of which is mounted on the control panel 46 and part of which is contained within the main chassis 14. The control panel 46 includes fuses, indicator lights and toggle switches. The various controls are used to control such things as the heat applied to powder stored within the cannister 20 by heating elements (not shown) mounted on the outside of the cannister 20. In particular, the controls shown on the control panel 36 utilize a servo system to accurately and precisely control the amount of powder introduced into the gas stream. The quantity of powder in the gas stream exiting via the hose section 38 can be measured and applied to the servo system to control the speed of the motor which drives the primary and secondary assemblies at the base of the cannister 20.

Mounted on the front plate 40 is a pair of stop blocks 50 and 52, the upper surfaces of which respectively receive a pair of stoppers 54 and 56 when the upper hopper assembly 12 is pivoted into a powder dumping position. Movement of the upper hopper assembly 12 into the dumping position is aided by a dump handle 58 coupled to and extending outwardly from the side of the cannister 20. The powder dumping position enables the cannister 20 to be emptied of the powder therein without turning the entire powder feeder 10 upside-down.

The gas flow is introduced to the powder feed control system 1 via a hose section 60 coupled between a source of the pressurized gas (not shown) and a two-way solenoid operated valve 62. The two-way solenoid operated valve 62 has an input 64 coupled to the hose section 60 and a pair of outputs 66 and 68. The output 66 forms a part of the main conduit 36 and is coupled to the hose section 34 through a hose section 70 and a check valve 72. The output 68 is coupled to a hose section 74 comprising a feeder bypass conduit 76.

The two-way solenoid operated valve 62 is electrically operated so as to couple the input 64 thereof to either the output 66 or the output 68 thereof. Accordingly, the gas flow in the hose section 60 is directed into either the main conduit 36 or the feeder bypass conduit 76 as determined by the valve 62. When the two-way solenoid operated valve 62 is actuated to couple the input 64 to the output 66, the gas flow from the hose section 60 is directed through the hose section 70, the check valve 72 and the hose section 34 into the powder feeder 10. The check valve 72 prevents powder in the powder feeder 10 from backing up to the two-way solenoid operated valve 62. As the gas flow from the hose section 34 enters the powder feeder 10 it is directed between the vanes of the rotating wheel so as to pick up a desired amount of powder prior to exiting from the powder feeder 10 via the hose section 38. This operation is described in detail in the previously referred to Muehlberger et al. application. The mixture of powder and gas which exits the powder feeder 10 via the hose section 38 is directed through a powder shutoff valve 78 and a pneumatic bypass and check valve 80 to an output hose section 82. The output hose section 82 directs the mixture of powder and gas to a plasma spraying environment which may be of the type shown in the previously referred to U.S. Pat. No. 4,328,257 of Muehlberger et al.

The powder shutoff valve 78 is controlled by a pair of one-way solenoid operated valves 84 and 86. The one-way solenoid operated valve 84 is coupled between a source of pressurized air (not shown) and the powder shutoff valve 78 by a hose section 88 and a pair of hose sections 90 and 92. The hose sections 90 and 92 have a T-joint 94 coupled therebetween. The T-joint 94 couples the one-way solenoid operated valve 86 to the conduit between the one-way solenoid operated valve 84 and the powder shutoff valve 78 as formed by the hose sections 90 and 92. The one-way solenoid operated valve 84 which is normally open so as to apply pressurized air to the T-joint 94 may be closed when desired to cut off the source of pressurized air from the powder shutoff valve 78. The pressurized air at the T-joint 94 is selectively applied to the powder shutoff valve 78 via the hose section 92 or is shunted away from the powder shutoff valve 78 by action of the one-way solenoid operated valve 86.

When the two-way solenoid operated valve 62 is positioned to direct the gas flow through the powder feeder 10 via the main conduit 36, the powder shutoff valve 78 is held open by action of the one-way solenoid operated valve 86 which is held in the open position so as to shunt pressurized air at the T-joint 94. When it is desired to terminate feeding of the powder into the gas stream, the two-way solenoid operated valve 62 is actuated so as to couple the input 64 to the output 68 and thereby divert the gas flow from the incoming hose section 60 into the feeder bypass conduit 76. Substantially simultaneously with the switching of the two-way solenoid operated valve 62, the one-way solenoid operated valve 86 is closed and the one-way solenoid operated valve 84, if closed, is opened. This action applies pressurized air through the T-joint 94 and to the powder shutoff valve 78 via the hose section 92. As described hereafter in connection with FIGS. 5–7 the application of pressurized air to the powder shutoff valve 78 has the effect of collapsing a resilient element contained therein so as to close off a central bore and prevent any further flow of powder from the powder feeder 10 to the output hose section 82. The powder shutoff valve 78 is designed to be able to effectively shut off the flow of powder in the face of very high powder supply pressures from the powder feeder 10 and without significant wear or deterioration in the face of the abrasive nature of the powder. When the twoway solenoid operated valve 62 is again switched so as to once again direct the gas flow through the main conduit 36 and the powder feeder 10, the one-way solenoid operated valve 86 is substantially simultaneously opened so as to shunt the pressurized air at the T-joint 94 away from the powder shutoff valve 78, thereby opening the powder shutoff valve 78 to the flow cf the gas and powder mixture therethrough. At the same time the one-way solenoid operated valve 84 is closed to shut off the supply of pressurized air to the T-joint 94.

When the gas flow is directed through the main conduit 36 and the powder feeder 10 so as to supply a mixture of gas and powder to the output hose section 82, the pneumatic bypass and check valve 80 allows the mixture of gas and powder to flow from the powder shutoff valve 78 into the output hose section 82 while at the same time preventing the mixture from flowing to the twoway solenoid operated valve 62 via the hose section 74. Conversely, when the incoming gas flow is directed into the hose section 74 by the two-way solenoid operated valve 62, the pneumatic bypass and check valve 80 allows the gas to flow freely into the output hose section 82. At the same time the powder shutoff valve 78 is closed, preventing the gas from flowing into the hose section 38. An example of the pneumatic bypass and check valve 80 is shown and described hereafter in connection with FIGS. 5–7.

Figure 2:
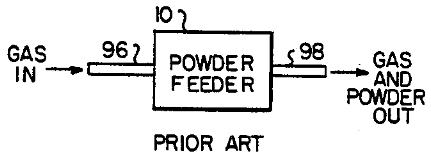
FIG. 2 is a block diagram of a typical prior art powder feed control system.
Figure 3:
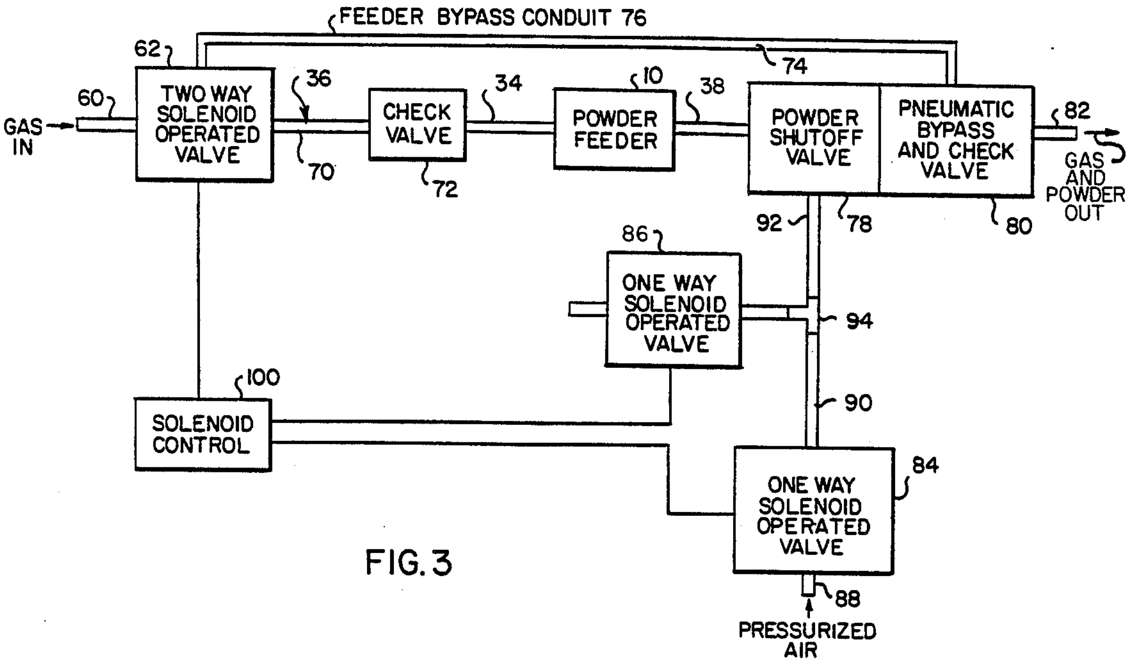
FIG. 3 is a block diagram of the powder feed ccntrol system of FIG. 1 in accordance with the invention.

The advantages of the powder feed control system 1 according to the invention can be better appreciated by referring to FIGS. 2 and 3. FIG. 2 depicts a typical prior art powder feed control system in conjunction with the powder feeder 10. The pressurized gas is supplied to the powder feeder 10 by an incoming hose section 96. An outgoing hose section 98 couples the powder feeder 10 to the plasma spraying environment. When powder is to be supplied, the gas source is turned on so as to cause gas to flow through the hose section 96 and into the powder feeder 10 for introduction of the powder into the gas stream. The resulting mixture of powder and gas then flows via the hose section 98 to the plasma spraying environment. When the supplying of the gas and powder mixture is to be terminated, the gas source is simply turned off so as to terminate the flow of gas through the hose section 96 and into the powder feeder 10. When delivery of the gas and powder mixture is again desired, the gas source is again turned on to begin the flow of gas through the hose section 96 and into the powder feeder 10. It typically takes several seconds or longer for gas pressure to build up within the powder feeder 10 to a desired level for the optimum feeding of the gas and powder mixture into the plasma spraying environment. In the meantime traces of powder are supplied at reduced pressure, making the plasma spraying operation difficult to control.

The prior art arrangement shown in FIG. 2 is particularly disadvantageous in situations where powder delivery must occur intermittently over intervals of a few second each. The time required to terminate the delivery of powder and then commence delivery once again may be many times longer than each powder delivery interval or period, resulting in a relatively slow and inefficient spraying operation. The problem is even further compounded where it becomes necessary to purge residual powder from the system each time the supplying of powder is terminated. Purging of the residual powder may require as much as ten seconds or longer to accomplish in some systems.

FIG. 3 depicts the powder feed control system 1 in accordance with the invention in block diagram form in conjunction with a solenoid control 100. The solenoid control 100 is coupled to operate the two-way solenoid operated valve 62 and the one-way solenoid operated valves 84 and 86. When powder is to be fed to the plasma spraying environment, the solenoid control 100 positions the two-way solenoid operated valve 62 to couple the hose section 60 to the hose section 70. The gas flows through the check valve 72 and into the powder feeder 10. The resulting gas and powder mixture from the powder feeder 10 flows through the powder shutoff valve 78 and the pneumatic bypass and check valve 80 to the output hose section 82 for supply to the plasma spraying environment. The powder shutoff valve 78 is held open by the solenoid control 100 which maintains the one-way solenoid operated valve 86 in the open position so as to shunt any pressurized air at the T-joint 94 away from the powder shutoff valve 78. The solenoid control 100 also normally closes the one-way solenoid operated valve 84 when the powder shutoff valve 78 is to be held open. When supplying of the powder is to terminate, the solenoid control 100 substantially simultaneously changes the positions of the two-way solenoid operated valve 62 and the one-way solenoid operated valves 86 and 84. This action couples the hose section 60 to the hose section 74 comprising the feeder bypass conduit 76 so as to direct the incoming gas flow through the feeder bypass conduit 76. At the same time closing of the one-way solenoid operated valves 86 and 84 directs the pressurized air into the pcwder shutoff valve 78 to close the valve 78 and prevent any further delivery of powder to the output hose section 82. In the meantime the gas flow in the feeder bypass conduit 76 flows freely through the pneumatic bypass and check valve 80 into the output hose section 82. When supplying of the powder to the plasma spraying environment is to again commence, the solenoid control 100 again changes the positions of the two-way solenoid operated valve 62 and the one-way solenoid operated valves 86 amd 84 substantially simultaneously. The incoming gas is therefore once again directed into the powder feeder 10 and the powder shutoff valve 78 is substantially simultaneously opened to permit the resulting gas and powder mixture to flow to the output hose section 82 for delivery to the plasma spraying environment.

Whereas the prior art powder feed control system shown in FIG. 2 requires considerable time for the pressure to build back up to an optimum level for supplying powder, the system of FIG. 3 is able to supply the powder at the nominal pressure almost instantaneously. When the two-way solenoid operated valve 62 is actuated to divert the gas flow into the feeder bypass conduit 76, the powder feeder 10 is almost immediately sealed off by the two-way solenoid operated valve 62 and the powder shutoff valve 78. This maintains the powder feeder 10 substantially at the nominal pressure in preparation for the next delivery of powder to begin. When the two-way solenoid operated valve 62 is again positioned to direct the gas flow into the powder feeder 10, the gas and powder mixture is directed to the output hose section 82 at the nominal pressure almost immediately. The ability to maintain nominal pressure in order to achieve uniform powder and gas flow is especially important in many commercial applications where large or stacked cannisters are used to hold large volumes of powder.

Figure 4:
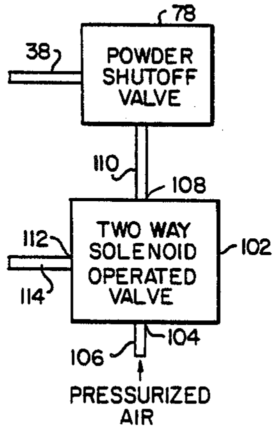
FIG. 4 is a block diagram of an alternative arrangement for use within a portion of the system of FIG. 3.

In the particular arrangement of the powder feed control system 1 shown in FIGS. 1 and 3, the powder shutoff valve 78 is controlled by the two different one-way solenoid operated valves 84 and 86 as previously described. FIG. 4 depicts an alternative arrangement for controlling the powder shutoff valve 78 which utilizes a single two-way solenoid operated valve 102. The two-way solenoid operated valve 102 has an input 104 thereof coupled to the source of pressurized air via a hose section 106. The two-way solenoid operated valve 102 has a first output passage 108 coupled to the powder shutoff valve 78 via a hose section 110 and a second output passage 112 coupled to atmosphere via a hose section 114. The solenoid control 100 shown in FIG. 3 is employed to control the two-way solenoid operated valve 102 so as to either couple the input 104 thereof to the output passage 108 or alternatively couple the output passage 108 to the output passage 112 thereof. The powder shutoff valve 78 is closed by positioning the two-way solenoid operated valve 102 to pass the pressurized air through the input 104 thereof so that it is communicated through the first output passage 108 and is applied to the powder shutoff valve 78 via the hose section 110. The powder shutoff valve 78 is opened by positioning the two-way solenoid operated valve 102 so as to close the input 104 thereof to the source of pressurized air. This action also couples the first output passage 108 to the second output passage 112 so as to release any pressure in the hose section 110.

Figure 5:
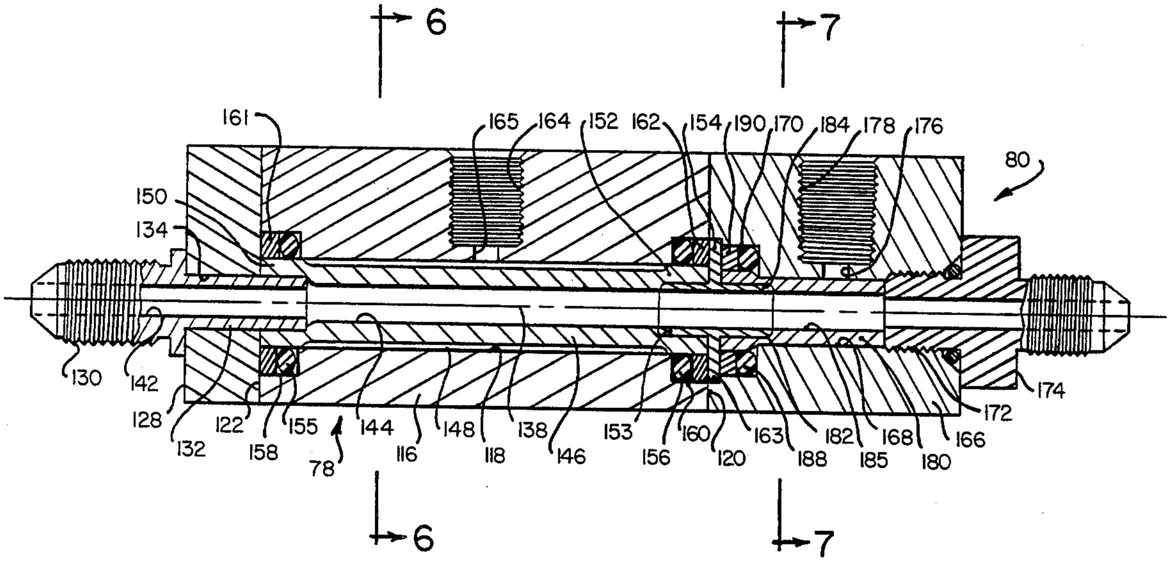
FIG. 5 is a sectional view of a combined powder shutoff valve and pneumatic bypass and check valve which may be used in the system of FIGS. 1 and 3.
Figure 6:
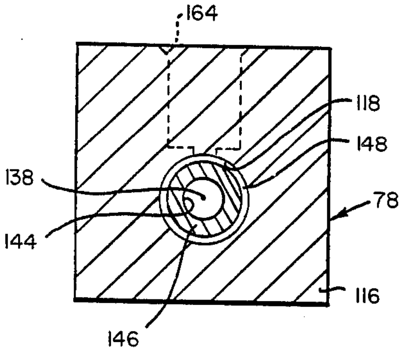
FIG. 6 is a sectional view of the arrangement of FIG. 5 taken along the line 6—6 of FIG. 5.
Figure 7:
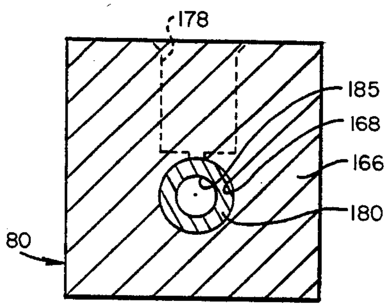
FIG. 7 is a sectional view of the arrangement of FIG. 5 taken along the line 7—7 of FIG. 5.

A preferred arrangement for the powder shutoff valve 78 and the pneumatic bypass and check valve 80 is shown in FIGS. 5, 6 and 7. The powder shutoff valve 78 has a generally rectangular housing 116 having a generally cylindrical bore 118 therein. The bore 118 which extends between opposite ends 120 and 122 of the housing 116 has a fixed diameter. An end fitting 128 is secured over the end 122 of the housing 116. The end fitting 128 mounts a fitting 130 which is used to couple the hose section 38 to the powder shutoff valve 78. The fitting has a nipple 132 which resides within an aperture 134 in the end fitting 128 and which extends into the bore 118.

The bore 118 within the housing 116 has a central axis 138. The aperture 134 within the end fitting 128 is coaxial with the central axis 138. Likewise, the fitting 128 has a central bore 142 therein which is coaxial with the central axis 138. The conduit through the powder shutoff valve 78 which is formed by the central bore 142 is extended by the intervening central bore 144 of a generally cylindrical member 146 of resilient material such as rubber. The member 146 which is mounted within the cylindrical bore 118 of the housing 116 extends between the end fitting 128 and the opposite end 120 of the valve 78 and has a uniform outer diameter along the length thereof which is slightly smaller than the diameter of the cylindrical bore 118. The result is that a relatively small space 148 is defined between the outer surface of the member 146 and the inner wall of the cylindrical bore 118 along a substantial portion of the length of the member 146. A first end 150 of the member 146 fits snugly over the nipple 132. An opposite second end 152 of the member 146 fits snugly over a nipple 153 formed by one side of a metal sealing ring 154 disposed at the end 120 of the housing 116. A sealing fit between the opposite ends 150 and 152 of the member 146 and the opposite ends of the cylindrical bore 118 is insured by O-rings 155 and 156 respectively disposed within slots 158 and 160 within the wall of the cylindrical bore 118 at the opposite ends of the bore 118. The O-ring 155 is pressed against the end 150 of the member 146 by an aluminum backup ring 161 disposed in the slot 158 between the O-ring 155 and the end fitting 128. In like fashion the O-ring 156 is pressed against the end 152 of the member 146 by an aluminum backup ring 162 disposed in the slot 160 between the O-ring 156 and a disk-shaped central portion 163 of the metal sealing ring 154.

The space 148 communicates with a threaded aperture 164 in the side wall of the housing 116 via a bore 165. The threaded aperture 164 is used to couple the powder shutoff valve 78 to the hose section 92 in the arrangement of FIG. 3 or to the hose section 110 in the arrangement of FIG. 4. When pressurized air is provided to the aperture 164 by action of either the one-way solenoid operated valves 86 and 84 of FIG. 3 or the two-way solenoid operated valve 102 of FIG. 4, the pressure is communicated by the bore 164 to the space 148. The result is that the member 146 collapses upon itself along a substantial portion of the length thereof so as to close off the central bore 144 and thereby close the powder shutoff valve 78. The pressure is confined within the space 148 due to the action of the sealing O-rings 155 and 156 which insure that the opposite ends of the member 148 are sealed off. To open the powder shutoff valve 78, the pressurized air is shunted away from the aperture 164 by action of the one-way solenoid operated valves 86 and 84 of FIG. 3 or the two-way solenoid operated valve 102 of FIG. 4. This allows the resilient member 148 to return to its natural, undeformed condition as shown in FIG. 5. This action opens the central bore 144 to allow the flow of a powder and gas mixture therethrough from the powder feeder 10.

The arrangement of the powder shutoff valve 78 shown in FIGS. 5–7 has a number of advantages. Because the resilient member 148 responds to the application of pressurized air by collapsing upon itself along a substantial portion of the length thereof, the abrasive action of the powder is distributed and is not concentrated in one localized area. This has the effect of greatly lengthening the useful life of the valve 78. The pressure of the air applied to the fitting 162 can be related to the pressure at the fitting 136 rather than having to assume some absolute value. Therefore, regardless of the pressure of the incoming gas and powder mixture at the fitting 136, it is only necessary that the pressure of the air at the aperture 164 be made larger so as to overcome the incoming pressure at the fitting 130 and close off the central bore 144. There is little danger of damaging the powder shutoff valve 78 due to excessive air pressure because the resilient member 148 simply collapses and compresses to greater extents with increasing pressures.

The pneumatic bypass and check valve 80 includes a generally rectangular housing 166 having a generally cylindrical bore 168 therein. The housing 166 is coupled to the end 120 of the housing 116 of the powder shutoff valve 78. With the housing 166 so coupled, the bore 168 therein is generally coaxial with the central axis 138 of the cylindrical bore 118 of the powder shutoff valve 78. The bore 168 has a diameter which is fixed along the length thereof except for a slot 170 therein adjacent the metal sealing ring 154 at one end of the bore 168 and a threaded aperture 172 at the opposite end of the bore 168. The threaded aperture 172 receives a fitting 174 used to couple the pneumatic bypass and check valve 80 to the output hose section 82. The bore 168 is coupled to the hose section 74 forming the feeder bypass conduit 76 by a bore 176 and a threaded aperture 178 in the side wall of the housing 166.

A hollow, generally cylindrical element 180 of flexible, plastic-like material is mounted within the bore 168 of the housing 166 so that the outer surface thereof normally resides against the walls of the bore 168. The element 180 has an end 182 thereof fitted snugly over a nipple 184 on the opposite side of the metal sealing ring 154 from the nipple 153. The element 180 has an internal bore 185 generally coaxial with the central axis 138 of the housing 116 of the powder shutoff valve 78. Sealing of the end 184 of the element 180 to the bore 168 is provided by an O-ring 188 disposed within the slot 170. The O-ring 188 is forced onto the end 184 of the element 180 by an aluminum backup ring 190 disposed within the slot 170 between the O-ring 188 and the disk-shaped central portion 163 of the metal sealing ring 154.

The end 182 of the element 180 forms a first input of the pneumatic bypass and check valve 80 for receiving a mixture of gas and powder from the powder feeder 10. The threaded aperture 178 forms a second input of the pneumatic bypass and check valve 80 for receiving the gas flow from the feeder bypass conduit 76. The fitting 174 forms the output of the pneumatic bypass and check valve 80 and serves to couple the valve 80 to the plasma spraying environment via the hose section 82. The pneumatic bypass and check valve 80 performs the function of coupling either of the two inputs thereof to the output while at the same time isolating the input formed by the threaded aperture 178 from the input formed by the end 184 of the element 180. When the gas and powder mixture is being provided to the output hose section 82 from the powder feeder 10, such mixture is confined within the bore 185 within the element 180 and is thereby directed to the fitting 174 while at the same time being prevented from flowing through the bore 176 and into the feeder bypass conduit 76. Conversely, when the gas flow is directed into the feeder bypass conduit 76, the gas flow passes into the threaded aperture 178 and the bore 176 and then onto the outside surface of the element 180. The element 180 deforms a sufficient amount for the gas to flow from the bore 176 to the fitting 174 for exit via the output hose section 82.

Referring again to FIG. 1, it was previously noted that the latches 32 allow removal of the cannister window subassembly 28 from the cannister 20 for the purpose of filling the cannister 20 with powder. When the cannister 20 is filled with powder, it is not uncommon for a quantity of air to be introduced into the cannister 20. The air may become entrapped in the powder and it may exist in the void internal volume of the cannister 20. Thereafter, as the system is operated to selectively feed powder, the presence of moist air within the powder and the cannister 20 often interferes with the uniform flow of the powder and entrainment thereof into the gas flow. The presence of air can also cause the formation of oxides during the thermal spray coating process.

Figure 8:
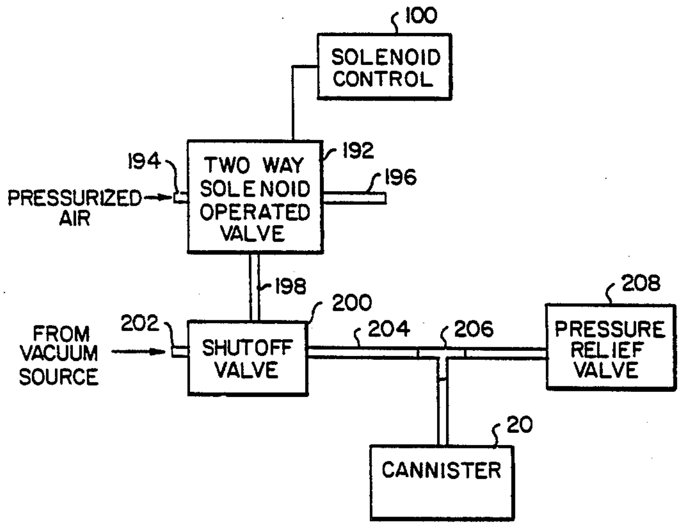
FIG. 8 is a block diagram of an arrangement within the powder feed control system of FIG. 1 for purging unwanted air from the powder storing cannister of the system.

An arrangement for purging the unwanted air from the cannister 20 is shown in FIG. 1 and in block diagram form in FIG. 8. Such arrangement includes a two-way solenoid operated valve 192 having an input coupled by a hose section 194 to a source of pressurized air which is not shown in FIG. 1 and which may be the same source as is coupled to the one-way solenoid operated valve 84 via the hose section 88. The two-way solenoid operated valve 192 has a first output coupled via a hose section 196 to atmosphere and a second output coupled via a hose section 198 to a shutoff valve 200. The shutoff valve 200 has a first end thereof coupled via a hose section 202 to a vacuum source or other source of reduced pressure (not shown) and an opposite end coupled via a hose section 204 to a T-joint 206. The T-joint 206 is coupled to the interior of the cannister 20 as well as to a pressure relief valve 208.

The shutoff valve 200 is identical in construction to the powder shutoff valve 78 shown in FIGS. 5 and 6 except that the end 120 of the housing 116 thereof is provided with a fitting like the fitting 130 at the opposite end 122 of the housing 116. The metal sealing ring 154 and the pneumatic bypass and check valve 80 are not present in the case of the shutoff valve 200. The hose section 198 from the two-way solenoid operated valve 192 is coupled to the threaded aperture 164 so that the pressurized air within the hose section 194 may be selectively applied to the space 148 surrounding the member 146 by the two-way solenoid operated valve 192. The fitting 130 mounted within the end fitting 128 is coupled to the vacuum source by the hose section 202. The fitting end and the opposite end 120 of the housing 116 of the valve is coupled to the T-joint 206 by the hose section 204.

In operation the two-way solenoid operated valve 192 normally couples the pressurized air within the hose section 194 to the shutoff valve 200 via the hose section 198 to maintain the shutoff valve 200 in the closed position. This has the effect of uncoupling the vacuum source from the inside of the cannister 20. After the cannister 20 is filled with powder, unwanted air therein is purged by changing the two-way solenoid operated valve 192 so as to block the flow of pressurized air therethrough to the shutoff valve 200 while at the same time coupling the hose section 198 to the hose section 196 to release pressure from the shutoff valve 200. This allows the shutoff valve 200 to open and couple the vacuum source to the inside of the cannister 20 for an appropriate period of time. The two-way solenoid operated valve 192 is then returned to the original position in which the pressurized air is applied to close the shutoff valve 200 and thereby uncouple the vacuum source from the inside of the cannister 20.

The pressure relief valve 208 provides a desirable safety feature. Should pressure buildup within the inside of the cannister 20 become excessive for any reason, the excess pressure is vented by the pressure relief valve 208.

After the cannister 20 has been filled with powder and unwanted air has been withdrawn or purged from the powder by coupling the vacuum source to the interior of the cannister 20 for a few seconds or longer as desired, the two-way solenoid operated valve 62 as shown in FIGS. 1 and 3 is desirably momentarily repositioned in order to couple the incoming gas flow to the powder feeder 10 via the check valve 72. This allows the gas to fill the cannister 20 and bring the gas pressure within the cannister 20 to operating pressure. The two-way solenoid operated valve 62 is then actuated to apply the incoming gas flow to the feeder bypass conduit 76 until such time as powder feeding is to begin.

It was previously noted that the powder shutoff valve 78 shown in FIGS. 5 and 6 is advantageous from the standpoint of wear and durability as well as other factors. This derives from the fact that the abrasive action of the powder passing through the valve 78 is distributed along substantially the entire length of the generally cylindrical member 146 of resilient material. Similar considerations apply in the use of a valve of like construction as the shutoff valve 200. The air which is purged from the interior of the cannister 20 following refilling has varying amounts of powder mixed therewith. The shutoff valve 200 is therefore capable of resisting the abrasive effects of the powder.

While the invention has been particularly shown and described with reference to preferred embodiments thereof, it will be understood by those skilled in the art that the foregoing and other changes in form and details may be made therein without departing from the spirit and scope of the invention.

What is claimed is:

1. In a spraying system, an arrangement for selectively introducing powder into a gas stream comprising the combination of means for providing a gas stream, an output, a source of powder, means for selectively coupling the gas stream to the output through a first line which includes the source of powder, means for alternately coupling the gas stream to the output through a second line which bypasses the source of powder, an input line for receiving the gas stream, a first valve arranged to couple the input line to the first line when in a first condition and to the second line when in a second condition, a second valve arranged to couple the output to the first line to the exclusion of the second line when in a first condition and to the second line when in a second condition and means responsive to a first command for placing the first and second valves in the first condition and to a second command for placing the first and second valves in the second condition.

2. The invention set forth in claim 1, further including a third valve coupled in the first line between the source of powder and the second valve and operative to close off the first line between the source of powder and the second valve when the second valve is placed in the second condition.

3. An arrangment for selectively providing a mixture of powder and gas in a plasma spraying system comprising the combination of a powder feeder, an output, a source of pressurized gas, means for selectively coupling the source of pressurized gas to the output through the powder feeder, means for alternately coupling the source of pressurized gas directly to the output so as to bypass the powder feeder, the means for selectively coupling the source of pressurized gas to the output through the powder feeder including a two-way valve coupled to the source of pressurized gas and a first line coupled between the two-way valve and the output and including the powder feeder, and the means for alternately coupling the source of pressurized gas directly to the output includes a second line coupled between the two-way valve and the output and a pneumatic bypass and check valve coupled between the output and the first and second lines and operative to isolate the second line from the first line at the output.

4. The invention set forth in claim 3, further including a powder shutoff valve coupled between the powder feeder and the pneumatic bypass and check valve, and means for shutting the powder shutoff valve when the two-way valve is caused to couple the source of pressurized gas to the second line.

5. The invention set forth in claim 4, wherein the powder shutoff valve comprises a housing having a generally cylindrical chamber therein, a flexible element of generally cylindrical configuration mounted within the chamber and having an outer diameter smaller than the diameter of the chamber to define a gas space and a hollow interior coupled in the first line and means for selectively applying pressurized gas to the gas space to compress the flexible element to close off the hollow interior thereof.

6. An arrangement for selectively providing a mixture of powder and gas in a plasma spraying system comprising the combination of means for providing a gas flow, an input conduit coupled to receive the gas flow, a two-way solenoid operated valve having an input coupled to the input conduit, a pair of outputs and being operative to couple the input thereof to one or the other of the pair of outputs, a powder feeder having a sealable powder-containing cannister, a powder shutoff valve operative to close an output end thereof from an input thereof in response to the application of pressurized gas thereto, a main conduit serially coupling the powder feeder between one of the pair of outputs of the two-way solenoid operated valve and the input of the powder shutoff valve, a pneumatic bypass and check valve having a pair of inputs and an output, the output being coupled to each of the pair of inputs and the pair of inputs being isolated from each other, one of the pair of inputs being coupled to the output end of the powder shutoff valve, a bypass conduit coupling a second one of the pair of outputs of the two-way solenoid operated valve to a second one of the inputs of the pneumatic bypass and check valve, and means for selectively applying pressurized gas to the powder shutoff valve.

7. The invention set forth in claim 6, wherein the means for selectively applying pressurized gas to the powder shutoff valve is operative to apply the pressurized gas to the powder shutoff valve whenever the input of the two-way solenoid operated valve is coupled to the second one of the pair of outputs.

8. The invention set forth in claim 6, wherein the means for selectively applying pressurized gas to the powder shutoff valve includes a source of pressurized air, first and second one-way solenoid operated valves, a first conduit coupling the first one-way solenoid operated valve between the source of pressurized air and the powder shutoff valve and a second conduit coupling the second one-way solenoid operated valve to a location in the first conduit between the first one-way solenoid operated valve and the powder shutoff valve.

9. The invention set forth in claim 6, wherein the means for selectively applying pressurized gas to the powder shutoff valve includes a source of pressurized air, a two-way solenoid operated valve having an input which is selectively coupled to either of a pair of outputs, a first conduit coupling the input of the two-way solenoid operated valve to the source of pressurized air and a second conduit coupling one of the pair of outputs of the two-way solenoid operated valve to the powder shutoff valve.

* * * * *